Jan. 20, 1953 P. R. GROSSMAN 2,626,141
FLUID HEATING APPARATUS
Filed April 24, 1948 2 SHEETS—SHEET 1
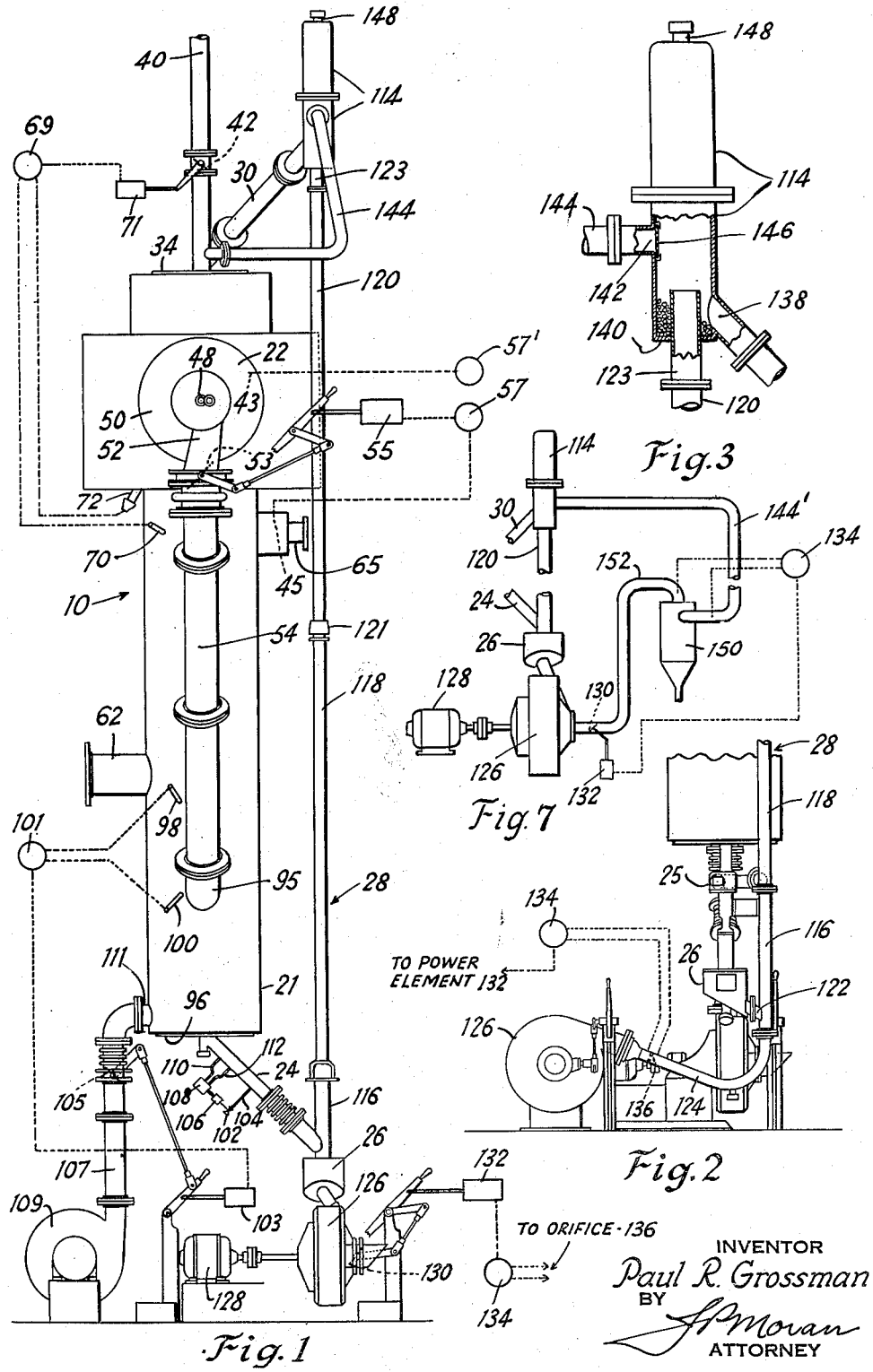
INVENTOR
Paul R. Grossman
BY
J. P. Moran
ATTORNEY Jan. 20, 1953     P. R. GROSSMAN     2,626,141
FLUID HEATING APPARATUS
Filed April 24, 1948     2 SHEETS—SHEET 2
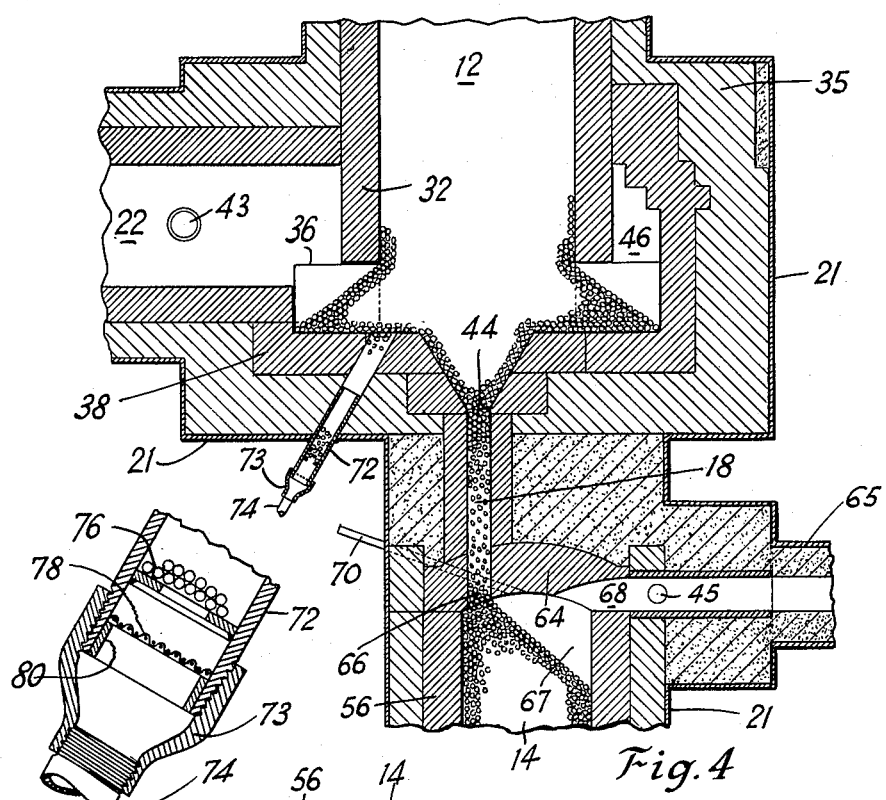
Fig. 4
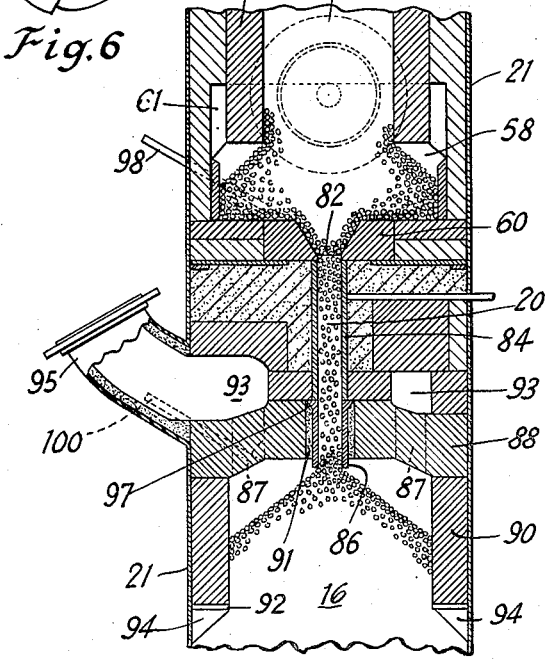
Fig. 6
Fig. 5
INVENTOR
Paul R. Grossman
BY
ATTORNEY Patented Jan. 20, 1953

2,626,141

UNITED STATES PATENT OFFICE 2,626,141

FLUID HEATING APPARATUS

Paul R. Grossman, Irvington, N. J., assignor to The Babcock & Wilcox Company, New York, N. Y., a corporation of New Jersey Application April 24, 1948, Serial No. 22,980

14 Claims. (Cl. 263—19)

The present invention relates to the construction and operation of fluid heaters of the moving bed type in which a column or mass of fluent solid heat transfer material is circulated downwardly through a plurality of superposed chambers in contact with separate fluids in heat transfer relationship therewith. This general type of apparatus is disclosed and claimed in my copending application filed March 20, 1947, Serial No. 735,978.

Fluid heaters of the type described are particularly useful in the thermal treatment of fluids wherein the temperatures involved are above the economic limits of metallic heat exchangers. In such fluid heaters the thermal process is advantageously continuous and is accomplished during the movement of a gas-pervious bed or mass of solid heat transfer medium through a heating zone, where the medium is heated to a high temperature, and is successively passed through one or more cooling zones where heat is transmitted to one or more fluids to be heated. The heat transfer medium is withdrawn from the bottom of the lowermost zone of the column and returned to the top of the column for recycling. The solid heat transfer medium is selected from materials capable of withstanding high temperatures without softening or cracking, and must be chemically inert to the fluids in contact therewith. Ordinarily, ceramic materials in the form of substantially spherical pellets can best meet the operating conditions of a fluid heater. However, while the ceramic pellets can withstand a limited amount of handling without breakage or "dusting," care must be observed in utilizing the ceramic heat transfer material so as to avoid excessive breakage. Usually, the majority of pellet breakage occurs during its withdrawal from the lowermost zone of the moving column and during its elevation to the top of the column. While broken pellets and dust from the pellets or from the refractory lining of the heater can be separated from the heat transfer bed during the operation of the apparatus, and makeup pellets may also be added, breakage should be held at a minimum for economically desirable low operating costs.

Ordinarily the zone or zones of fluid heating within the fluid heater are constructed and operated so as to maintain a separation between the different fluids. The separation of fluids can be maintained by a balance of fluid pressures between the zones as disclosed by the Bailey et al., Patent No. 2,417,049, wherein the fluid pressures within adjacent zones are regulated in response to the differential fluid pressure therebetween. The accuracy of such a control depends upon a true comparative indication of fluid static pressures within the separate zones and it is essential that the static pressure connections to the separate zones be maintained in an operative condition.

The main object of the present invention is to provide a fluid heater of the type described capable of operation at high temperatures over long periods of time with a minimum of outages and with low maintenance costs. A further and more specific object is to provide a pneumatic elevator to return heat transfer medium from the bottom of a fluid heater to the top thereof for reuse in the heat exchange process. An additional object is to provide a fluid flow control apparatus which is capable of establishing and maintaining a fluid flow velocity through a pneumatic elevator at a predetermined optimum flow rate so to to avoid excessive breakage of the heat transfer material during movement therethrough. A further specific object is to provide a simple and positive fluid seal at the bottom of the fluid heater which is automatic in operation and effectively prevents fluid flow into or out of the heat transfer medium outlet. An additional object is to provide a readily cleanable static pressure connection to the heating zone of the fluid heater so that an accurate and consistent indication of the static pressure of the heating fluid passing through the fluid heater may be obtained for proper regulation of the fluid pressures within the apparatus so as to maintain a positive separation between the fluids in the zones of the fluid heater.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described several embodiments of my invention.

Of the drawings:

Fig. 1 is an elevation view of a fluid heating unit constructed in accordance with the present invention;

Fig. 2 is an elevation view of the lower portion of the apparatus viewed from the right hand side of Fig. 1;

Fig. 3 is an enlarged elevation view, partly in section, of a portion of the apparatus shown in Fig. 1;

Figs. 4 and 5 are enlarged elevation views, in section, of separate portions of the apparatus shown in Fig. 1;

Fig. 6 is an enlarged section of a portion of the apparatus shown in Fig. 4; and Fig. 7 is a schematic view of a modified arrangement of a portion of the apparatus shown in Fig. 1.

In general, a fluid heater of the type shown in Fig. 1 includes a plurality of superposed refractory lined chambers connected by vertically elongated refractory lined conduits which confine a mass or bed of heat transfer material pellets. The mass or column of pellets is continuously moved downwardly through the heater in direct contact heat exchange relationship with a plurality of fluids. Ordinarily the pellet bed is heated in the uppermost chamber by heat exchange with a heating fluid and subsequently serially cooled in one or more subjacent chambers by heat exchange with one or more fluids to be heated. The rate of pellet movement downwardly through the chambers of the fluid heater is regulated by a feeder which is arranged to withdraw pellets from the lowermost chamber and to discharge them into an elevator for return to the upper heating chamber.

More specifically, the embodiment of the fluid heater 10 shown in Figs. 1, 4 and 5 consists of an upper heating chamber 12, an intermediate fluid heating chamber 14, and a lower fluid heating chamber 16. The chambers are connected by elongated throat conduits 18 and 20 of reduced cross-sectional flow area between the upper and intermediate chambers, and the intermediate and lower chambers, respectively. As shown in Fig. 1, the fluid heater is enclosed by a pressure-tight metallic casing 21 which is provided with suitable openings therein corresponding with inlet and outlet ports in the refractory lining and intervening insulating materials, for the movement of fluids and heat transfer material pellets therethrough, as hereinafter described. The lower portion of the upper chamber 12, with a portion of an associated combustion chamber 22, and the upper portion of the intermediate chamber 14 with their connecting throat conduit 18 is shown in section in Fig. 4. In a similar manner, the lower portion of the intermediate chamber and the upper portion of the lower chamber 16, with their connecting throat conduit 20 is shown in Fig. 5. A fluent solid mass or bed of the pellets is moved downwardly as a column through the chambers and the connecting throats to form a continuous bed of gas-pervious material extending from the upper portion of the heating chamber 12 to an outlet in the bottom of the lowest chamber 16.

The pellets are withdrawn at a controlled rate from the bottom of the chamber 16 through a tubular conduit or spout 24 by a suitable mechanical feeder 26. The feeder is advantageously constructed and arranged with a variable speed drive, shown generally at 25, so that the rate of withdrawal of pellets from the fluid heater 10 may be regulated in accordance with the desired rate of fluid heating. From the feeder, the pellets are discharged into a pneumatic elevator 28, as hereinafter described, elevated and discharged through a closed chute 30 into the upper end portion of the chamber 12 for reuse in the fluid heater.

The heat transfer pellets utilized in the fluid heating apparatus may be selected from a variety of materials having the requisite chemical and physical qualities. Chemically the material should be inert to the fluids in contact therewith under the operating conditions of the fluid heater. Physically the material should be capable of withstanding the high temperatures encountered in operation without cracking or softening, and should be sufficiently hard and strong to resist dusting or breakage under the handling conditions encountered in the operation of the heater. Manufactured ceramic material having an alumina or mullite base fulfill both the chemical and physical requirements of the heat transfer medium, and pellets of substantially spherical shape have been successfully utilized. The pellet size is selected to provide a large surface area for heat transfer and sufficient density to withstand the fluid flow velocities through the pellet beds. A desirable size of ceramic pellet has been found to be approximately $\frac{5}{16}$ inch in diameter, but the size may vary from that dimension, depending upon the desired operating conditions in the fluid heater.

The upper heating chamber 12, as shown in Figs. 1 and 4, has a circular refractory wall 32 backed by insulating material 35 extending from a cover plate 34 at the top of the chamber to, and supported upon, a plurality of circumferentially spaced refractory blocks 36 which are in turn supported upon a horizontally disposed refractory floor 38. The cover plate 34 is provided with an opening for the closed chute 30 and a separate opening connected to a stack 40. The stack is provided with a damper 42 to control the flow of spent heating gases from the chamber 12, as hereinafter described. The refractory floor 38 is provided with a centrally located pellet discharge opening 44 which matches the upper end of the throat 18. The pellet discharge passageway through the floor 38 to the opening 44 is defined by the annular wall of an inverted truncated cone formed in the floor 38, and so proportioned and positioned that an upward extension of the annular wall would intersect the lower circumferential edge of the wall 32.

An annular chamber 46 surrounds the lower portion of the wall 32 and is arranged with a side inlet opening to receive heating gases generated from the combustion of a fuel in the horizontally disposed combustion chamber 22. The heating gases pass from the annular chamber 46 in a circumferentially distributed stream between the spaced blocks 36 and beneath the lower end of the wall 32 upwardly through the interstices of the pellet mass, to the stack 40.

The combustion chamber 22 is of substantially uniform circular cross-section and is axially elongated to provide adequate space for the complete combustion of fuel therein. The chamber is provided with a fuel burner 48 at its outer end, and a combustion air hood 50 surrounding the burner. As shown, the burner and hood are arranged for a liquid fuel, although it will be understood that a gaseous fuel burner may be used to fire the combustion space of the chamber 22. As shown in Fig. 1, combustion air is delivered to the hood 50 through a tangentially arranged inlet connection 52 which receives preheated air from a duct 54. The combustion air is preheated in the lower chamber 16, as hereinafter described, and is burned with the liquid fuel in the chamber 22 to obtain the desired heating gas temperature and composition, for delivery to the heating chamber 12. The amount of air delivered to the combustion chamber 22 is regulated by a damper 53 located at the upper end of the duct 54. As shown diagrammatically in Fig. 1, the damper 53 is positioned by a power element 55 actuated through a transmitter 57 in accordance with the temperature of the heated fluid discharged from the chamber 14, as measured by a thermocouple indicated in Fig. 4 at 45. Such a control arrangement is disclosed and claimed in my copending joint application with J. F. Shannon, Serial No. 31,258, filed June 5, 1948, now Patent No. 2,577,655. A thermocouple 43, positioned within the combustion chamber 22, is connected with an indicating and recording instrument 57', as an operating guide to the temperatures in the chamber. The instrument 57' may be provided with a high temperature alarm to provide a warning when the combustion chamber temperature exceeds a predetermined limit. In practice the transmitter 57 and the instrument 57' are usually combined in a common case, with the temperatures separately recorded upon the same chart. In addition to the combustion air flow control, the flow of liquid fuel to the burner 48 is automatically regulated to maintain a preselected ratio of fuel flow to combustion air flow. The air-fuel ratio control is not shown, but is also disclosed in the Bailey patent.

The centrally located opening 44 from the chamber 12 is connected with the throat 18 for the flow of heated pellets from the upper heating chamber 12 to the subjacent intermediate chamber 14. The upper portion of the chamber 14 is shown in Fig. 4, while the lower portion is shown in Fig. 5. A refractory wall 56 defines the chamber 14 and extends downwardly to a plurality of circumferentially spaced radially positioned refractory blocks 58 supported upon a refractory floor 60. This construction is similar to that of chamber 12, as illustrated in Fig. 4. The lower portion of the chamber wall 56 is surrounded by an annular distributing chamber 61 arranged to receive a fluid to be heated through a connecting duct 62. The top 64 of the chamber 14 is formed by a refractory arch which is provided with an inlet opening 66 for heated pellets adjacent the wall 56 and forming a continuation of the throat 18. An outlet opening 68 is also provided in the top 64, on the side of the chamber opposite the pellet inlet opening 66, for the discharge of the fluid heated in the chamber 14 through a pipe 65. The pellet inlet is located adjacent the side wall of the chamber 14 so that the pellets, in assuming their natural angle of repose, will provide a free space 67 above the upper surface thereof and beneath the top 64 for the collection and discharge of heated fluid through the outlet 68. Such an arrangement of pellet inlet and fluid outlet is particularly desirable in the heating of relatively small quantities of fluid, wherein the fluid heating chamber is of small diameter.

In the operation of the apparatus described, it is desirable to avoid a leakage of fluids between the adjacent chambers through the connecting throat 18. To avoid fluid flow through the throat the static pressures within the chambers at opposite ends of the throat are maintained in a substantially balanced condition. This is accomplished by means of a control system diagrammatically shown in Fig. 1. The system includes a differential pressure controller-transmitter 69 actuated through pressure connection tubes 70 and 72 opening into the chambers 14 and 12 respectively as indicated in Fig. 4. The controller 69 transmits a power impulse to a power element 71, in response to the pressure differential existing across the throat 18, to position the valve 42 which regulates the pressure in the heating chamber 12. The control mechanism may be of the pneumatic type, such as disclosed in the Bailey Patent 2,417,049, or it may be an electro-pneumatic unit of any well known type, suitable for the purpose described.

The pressure connections for the controller 69 are particularly shown in Fig. 4. The metallic tube 70 extends through the casing 21 and into the outer portion of the domed top 64 of chamber 14. The top 64 is correspondingly drilled to provide a continuation of the bore of tube 70 opening into the free space 67 above the pellet surface in the upper portion of the chamber 14. The outer end of the tube 70 is connected with the fluid pressure sensitive controller 69.

The pressure connection to the upper chamber 12 is formed by an alloy metal tube 72 which is extended through the casing 21 and into the insulating material 35 beneath the floor 38. The insulating material and the floor are bored to form an opening therethrough extending from the upper end of the tube 72 into the chamber 12. The lower end of the tube 72 is provided with a threaded reducer fitting 73 which attaches to a pipe 74 connected with the fluid pressure controller 69. As shown in Figs. 4 and 6, an orifice plate 76 is welded in the lower end portion of the tube 72. Between the plate 76 and the end of the tube a coarse mesh screen 78 is mounted on a removable collar 80. The dimension of the orifice opening in the plate 76 is selected to be greater than the diameter of an individual pellet, but small enough to permit bridging of the pellets thereacross. Occasionally, unusual vibration in the apparatus or an unexpected shock will cause a breakage of the pellet bridge across the orifice allowing some pellets to pass, before the pellet bridge is re-established. Under these conditions, the screen 78 will prevent movement of the pellets into the pipe 74. Since the pressure connection opens upwardly into the chamber 12, and it is exposed to high fluid temperatures, dust will gradually accumulate therein making an occasional cleaning desirable. This is accomplished by removing the reducer fitting 73 and the screen 78 from the lower end of the tube 72 and "poking" or "rodding" the pellets. This causes pellets and dust to be discharged through the orifice, to be replaced by relatively clean pellets which will fill the pressure connection.

As shown in Fig. 5, the lower end of the intermediate chamber 14 is provided with a centrally positioned pellet outlet 82 therein matching the upper end of the throat 20. The pellet discharge passageway through the floor 60 is shaped as an inverted truncated cone and so proportioned and positioned that an upward extension of its sides would intersect the inner circumferential edge of the wall 56. The throat passageway 20 is defined by a pair of refractory tubes arranged in abutting end to end relationship with the upper tube 84 securely fitted into the refractory materials between the adjacent chambers 14 and 16. The lower tube 86 is grouted into the refractory materials forming the roof 88 of the lower chamber 16, as hereinafter described, so as to be replaceable upon need without a major reconstruction of the refractory portion of the apparatus surrounding the throat 20.

The lower fluid heating chamber 16 has a circular wall 90 extending downwardly from the roof 88 to an inwardly projecting wall supporting metallic flange 92 attached to the casing 21 by a plurality of circumferentially spaced brackets 94. Beneath the flange 92 the bottom of the chamber (not shown) is formed by a metallic plate shaped as an inverted truncated cone ending in a lower pellet outlet connected with the spout 24. The lower portion of the bottom plate is perforated for the upward admission of fluid therethrough from a surrounding annular distributing chamber enclosed by the casing 21 and a horizontally disposed metallic bottom plate 96. This type of lower chamber construction is described and shown in my co-pending application.

The roof 88 of the chamber 16 is of a flattened dome shape made by the assembly of segments of refractory tile and having a central opening therethrough forming a recess 91 to receive the lower throat tube 86. A circumferential series of fluid outlet passageways 87 are provided through the roof 88 adjacent the inner surface of the wall 90 and are in communication with an annular chamber 93 surrounding the lower end portion of the throat tube 84. A refractory lined elbow member 95 connects the annular chamber 93 with the duct 54.

The throat tube 86, as well as the tube 84, is fabricated from a high temperature and abrasion resisting refractory material, such as silicon carbide. The tube 86 is constructed with a greater axial length than the depth of the recess 91 so that the lower end of the tube will project into the upper end portion of the chamber 16 and beneath the lower surface of the roof 88. As a result, the upper surface of the pellet mass within the chamber 16 is spaced from the roof 88 so as to provide an adequate free space in the upper portion of the chamber 16 for the collection and substantially uniform discharge of fluid from the mass of pellets therein. The throat tube 86 is provided with an outwardly flaring flanged end 97. Upon installing the tube 86, the flanged end 97 is in abutting relationship with the tube 84 and is secured in position by an initially plastic refractory material rammed into the opening between the exterior surface of the tube and the interior surface of the recess 91.

Pressure connection tubes 98 and 100 open into the chambers 14 and 16 respectively, at opposite ends of the throat 20 and are connected with a differential pressure sensitive controller-transmitter 101. The controller transmits a power impulse to a power element 103 to position a damper 105 in an air supply duct 107. The air duct 107 directs a flow of air from a blower 109 to an inlet connection 111 leading into the lower chamber 16. The air is preheated by countercurrent contact with the bed of pellets within the chamber 16 and is discharged through the outlet connection 95 into the duct 54 for subsequent use as a preheated combustion constituent in the chamber 22.

The pellets, in moving from the bottom of chamber 16 pass through the spout 24 into the feeder 26. The feeder advantageously may be of the type disclosed and claimed in the co-pending application of A. M. Kohler, Serial No. 569,251, filed December 21, 1944, now Patent No. 2,468,712. Such a feeder provides an accurate means for regulating the rate of pellet movement through the fluid heater 10, without appreciable breakage of pellets, but does not provide a seal against fluid flow through the interstices of the pellet mass in the spout 24. Although the length of the spout 24, with the fluent mass of pellets therein, provides some sealing effect against the flow of fluids, its sealing effect is insufficient when an appreciable difference prevails in the fluid pressures at opposite ends of the spout. Under such conditions, it has been customary to introduce an inert fluid, such as for example steam, into the discharge spout at a point intermediate its length and at a higher pressure than the fluid pressure at either end of the spout. The sealing fluid will flow in both directions through the spout, with the greater flow occurring toward the spout end having the least pressure, and will thus prevent flow of fluid from the chamber 16 toward the feeder 26. Frequently a flow of sealing fluid in the opposite direction into the chamber 16 is also undesirable, due to its diluting effect on the fluid being heated, or by reason of a possible increase in pressure within the chamber and its attendant effect upon the controller 101.

As shown in Fig. 1, I provide a flow control valve 102 in the sealing fluid inlet pipe 104 to regulate the flow of sealing fluid to the spout 24. The valve is automatically positioned so as to maintain a condition of substantially zero fluid flow through a selected portion of the spout 24 in the pipe 104 and the chamber 16. This is accomplished by a valve positioning mechanism 106, such as a pneumatic power piston of well known type, actuated by a fluid pressure differential controller-transmitter 108 of the diaphragm type which is provided with a pair of pressure connections 110 and 112 opening into the spout 24 at longitudinally spaced positions between the pipe 104 and the lower chamber 16. The controller 108 can be adjusted to maintain a flow of sealing fluid through the pipe 104 when the differential pressure between connections 110 and 112 equals zero. A zero differential pressure indicates a zero flow of fluid in the spout 24 between the spaced pressure connections. The controller 108 will cause the valve 102 to open for an increased flow of sealing fluid through the pipe 104 when the differential pressure indicates fluid flow downwardly through the spout 24, and will cause the valve to approach its closed position when the differential pressure across the connections 110 and 112 indicates a flow of fluid upwardly through the spout 24. In this manner, a "no-fluid flow" condition can be maintained in the spout 24 between the chamber 16 and the pipe 104 so that the fluid in chamber 16 will be neither diluted, nor lost by leakage to or from the bottom of the chamber. Such a control mechanism is particularly important in the operation of a fluid heater in conjunction with a pneumatic type of pellet elevator, as hereinafter described.

The pneumatic elevator 28 is arranged to receive the pellets discharged by the feeder 26 and to lift the pellets in a carrier fluid stream for discharge at the upper end of the elevator. The carrier fluid may be air or any other gaseous fluid, depending upon the condition of the pellets delivered thereto. For example, if the pellets are coated with carbon, or some other chemical which is reactive with oxygen under the prevailing temperature conditions within the pneumatic elevator, it is desirable to utilize an inert carrier fluid. Under such conditions the gaseous carrier fluid may be recycled through the elevator system so as to minimize loss of the fluid. An arrangement of apparatus for recycling the carrier fluid is shown in Fig. 7. However, air is ordinarily utilized as a carrier fluid, and the apparatus disclosed in Fig. 1 is arranged for its use.

As shown in Fig. 1, the pneumatic elevator 28 consists of a vertically extending tube having an inlet adjacent its lower end for the delivery of pellets thereto from the feeder 26, a bottom inlet for the admission of carrier air, and a cap member 114 at the top for the separation of the pellets from the carrier air. The tube is constructed with an upwardly increasing diameter so that the velocity of air flow through the tube will not increase appreciably due to the increase of air temperature during passage through the tube. It will be observed that the temperature of the pellets delivered to the elevator will ordinarily exceed the entering carrier air temperature. During the passage of the air and pellets through the tube, the intimate relationship therebetween will increase the temperature, and thus the volume, of the air. This increase in air temperature may be of the order of 100° F. or greater, and result in as much as a 10% increase in air volume and flow velocity. In the illustrated embodiment of the pneumatic elevator the tube is assembled in three tube sections, namely 116, 118 and 120, with each section having a nominally uniform diameter throughout its length. The upwardly increasing pipe diameter may be obtained by utilizing standard pipe or tube sizes, wherever possible, with different wall thicknesses. For example, the lower section 116 may consist of a length of 3 inch extra heavy pipe, the intermediate section 118 of a length of 3 inch standard weight pipe, and the upper section 120 of a length of 3¼ inch internal diameter tube. The sections are bolted together with a slip joint 121 between adjoining sections to permit expansion and contraction of the assembled tube, relative to its supports (not shown) on the fluid heater 10, due to temperature changes.

The tube section 116 is arranged to receive the pellets from the feeder 26 through a discharge chute 122 and an inlet opening in the side wall of the tube upwardly adjacent the bottom air inlet. The carrier air is delivered to the elevator through an air pipe 124 from a blower 126 which is driven by a constant speed electric motor 128. The blower is provided with a damper 130 in its inlet to regulate the flow of carrier air through the pneumatic elevator. The damper is positioned by a power element 132 connected therewith through a suitable operating mechanism, with the element 132 regulated by a transmitter 134. The transmitter 134 is of a well known type arranged to be actuated in response to the differential pressure created by the flow of air through an orifice 136 located in the pipe 124. The damper is positioned for a desired air flow rate through the fan and pneumatic elevator, and this flow rate is maintained by the operation of the flow sensitive transmitter 134.

The upper end of the tube 120 is attached to a stub tube section 123 which is of a corresponding internal diameter and is welded to the cap member 114. The stub section 123 projects into the lower end portion of the cap member to a spaced position above a horizontally disposed annular plate 140 encircling the tube section 123 and forming the bottom of the cap member. The cap member is vertically elongated and has an internal cross-sectional area at least four times as great as the cross-sectional area of the tube section 123. The axial length of the member 114 may be, for example, 10 to 15 times the internal diameter of the tube section 123, as measured above the open upper end of the section 123. A pellet outlet port 138 is located in one side of the cap member 114 with its lower edge corresponding with the surface of the horizontally disposed annular plate 140. The upper edge of the port 138 is below the upper open end of the tube section 123 so that as pellets are separated from the carrier air within the cap member, they pass through the port 138 into the chute 30 and thence into the upper chamber 12. The carrier air escapes through an outlet opening 142 in the side of the member 114 and passes through a duct 144 and the stack 40 to the atmosphere. The air outlet is located above the open end of the tube 134 and is provided with a coarse mesh screen 146 to prevent the discharge of pellets through the duct 144. The cap member is further provided with a view port 148 at the top thereof, which is closed by a removable cover.

In accordance with my present invention the carrier air velocity through the pneumatic elevator is adjusted to provide sufficient velocity to transport the pellets without choking the elevator, and at a velocity sufficient to project the pellets into the cap member 114 without their striking the top closure. The damper 130 controls the velocity of air flow through the pneumatic elevator and is manually adjusted for the desired carrier air velocity as determined by observation of the elevator operation through the view port 148. Thereafter, optimum air flow conditions are maintained by the previously described control mechanism actuated by the transmitter 134. Within reasonable limits the pellet carrying capacity of the pneumatic elevator may be changed without change in the velocity of carrier air passed through the elevator tube.

With the apparatus disclosed and under the described conditions of pneumatic elevator operation, the carrier air flow through the elevator is established and maintained at a velocity sufficient to reverse the initial downward movement of the pellets delivered thereto and to lift the pellets through the elevator tube for discharge at the upper end at a pellet velocity capable of being arrested in a short distance without damage to the pellets. Advantageously it is desirable to introduce the pellets, delivered by the feeder 26, into the carrier air stream with a small component of downward movement. This can be accomplished by causing the pellets to flow over a roughened surface in the spout 122, or over a stationary bed of pellets maintained in the spout, so that the velocity of individual pellet movement into the elevator is at a minimum. In any event the air flow velocity must be great enough to overcome the gravitational force acting on the pellets and to reverse the direction of pellet movement. The minimum velocity of air flow at this position in the elevator can be calculated with reasonable accuracy or it can be determined experimentally.

Those skilled in the art will appreciate that the pellets, in passing through the elevator tube, will be accelerated in their upward flow by contact with the carrier air stream. The rate of pellet acceleration will depend upon such factors as the density, surface area and surface characteristics of the pellets, and upon the velocity of the carrier air stream. Ordinarily, the pellets will quickly attain their maximum upward velocity in the lower portion of the elevator tube, and move upwardly through the major length of elevator tube to the cap member 114 at a substantially uniform velocity. The maximum velocity of pellet movement through the pneumatic elevator will be a relatively small fraction of the carrier air velocity.

The pellets, in ascending with the carrier air stream in the tube sections of the elevator will tend to travel along the axis of the elevator. This is due to the frictional effect of the confining tube walls causing a laminar air flow therethrough with the air in the axial portion of the tube traveling at the highest velocity. Such a flow characteristic tends to minimize the abrasion of the pellets against the wall of the tube. As the carrier air, with its entrained pellets, enters the cap member 114 the air expands outwardly with a reduction in its velocity. The pellets will also move outwardly of the vertical axis of flow during their upward movement in the cap member due to the reduction in carrier air lifting power. When the force of gravity acting on the pellets overcomes the lifting power of the carrier air the pellets will fall gently to a bed of substantially stationary pellets maintained on the bottom of the member 114, and flow by gravity through the spout 30. Since the upward pellet movement is arrested and the downward movement of the pellets occurs in the reduced flow velocity of the carrier air stream the separation of pellets from the carrier air is accomplished with a minimum of physical shock to and breakage of the pellets.

In the arrangement of Fig. 1 the carrier air is discharged into the stack 40 at a location between the pellet bed in the chamber 12 and the damper 42. As a result, any change in the position of the damper to regulate the heating fluid pressure within the chamber 12 will also affect the pressure of the carrier fluid in the pneumatic elevator. Ordinarily, the range of pressure changes within the chamber 12 will be well within the capacity of the blower 126 so that such changes will not appreciably affect the operation of the pneumatic elevator. However, under some conditions of heater operation it may be desirable to vent the duct 144 directly to the atmosphere so that changes in the fluid pressure within the fluid heater will not affect the elevator. Under such conditions the duct 144 may be arranged to discharge into a dust arrestor, or the like, before venting to atmosphere, so as to reduce the dust content of the vented carrier air.

As a further alternative arrangement, the carrier fluid may be reintroduced into the blower inlet to provide a closed fluid circuit. Such an arrangement is illustrated in Fig. 7, and is particularly useful when the fluid heater 10 is operated at high pressures or when an inert gas is used as a carrier fluid in the pneumatic elevator. As shown, the duct 144' directs the flow of carrier fluid from the member 114 tangentially into a cyclone dust collector 150. From the cyclone the carrier fluid passes through a duct 152 into the inlet of the blower 126. The flow control valve 130 at the blower inlet is regulated by the power element 132 in response to impulses transmitted thereto by the transmitter 134, as hereinbefore described. In this embodiment of the invention, the transmitter responds to the differential pressure drop obtained by the fluid flow through the cyclone 150.

It will be noted that the fluid heater of the present invention is particularly adapted for the thermal treatment of fluids at high temperatures where the continuity of operations can be sustained over long periods of time with low maintenance costs. The separate fluids in contact with the column of heat transfer pellets within the separate chambers of the heater are maintained in a separated condition by the fluid pressure control described. As disclosed, the control mechanism of the transmitter 69 can be readily maintained in an operative condition by the use of the cleanable feature of the pressure connection 72. Even though the abrasion of pellet flow on the throat tube 36 may necessitate its replacement, such a replacement will be infrequent and can be accomplished without a major replacement of the surrounding refractory materials. The pneumatic elevator with its associated fluid seal control, including the transmitter 108, provides apparatus that is simple to operate and economical in its operation and maintenance. The pneumatic elevator is especially useful for the handling of the relatively hot pellets with a minimum of damage and replacement costs of the heat transfer material.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a heat transfer apparatus, the combination comprising a gas pervious column of fluent solid heat transfer material enclosed by walls defining a plurality of superposed chambers connected by elongated throat passageways of reduced cross-sectional area, means for separately contacting the heat transfer material within said superposed chambers by separate fluids for direct contact heat exchange therewith, a feeder arranged to withdraw heat transfer material from the bottom of said column at a selected rate for the gravitational flow of said material through said chambers and connecting throat passageways, a pneumatic elevator arranged to receive the heat transfer material from said feeder and to deliver said material to the upper end of said column, and means for maintaining the velocity of air flow through said pneumatic elevator at a predetermined value to minimize breakage of said heat transfer material in passing therethrough including a fan arranged to deliver air at a positive pressure into the lower end of said elevator, and a damper in said fan inlet for regulating the volume of air delivered by said fan.

2. In heat transfer apparatus, the combination comprising a gas pervious column of fluent solid heat transfer material enclosed by refractory walls defining a plurality of superposed chambers connected by elongated throat passageways of reduced cross-sectional area, means for separately contacting the heat transfer material within said superposed chambers by separate fluids for direct contact heat exchange therewith, a feeder arranged to withdraw heat transfer material from the bottom of the lowermost chamber of said column at a selected rate for the gravitational flow of said material through said chambers and connecting throat passageways, fluid-lift means arranged to receive the heat transfer material from said feeder and to deliver said material to the uppermost chamber at the uper end of said column, a fan arranged to deliver fluid at a positive pressure to said fluid-lift means as a carrier medium for said heat transfer material, and means for regulating fluid flow from said fan in response to a deviation of said flow from a predetermined value.

3. In heat transfer apparatus, the combination comprising a gas pervious column of fluent solid heat transfer material enclosed by refractory walls defining a plurality of superposed chambers connected by elongated throat passageways of reduced cross-sectional area, means for separately contacting the heat transfer material within said superposed chambers by separate fluids for direct contact heat exchange therewith, a feeder arranged to withdraw hot heat transfer material from the bottom of said column at a selected rate for the gravitational flow of said heat transfer material through said chambers and connecting throat passageways, and means arranged to receive the heat transfer material from said feeder and to deliver said material to the upper end of said column including a vertically elongated tube having an upwardly increasing internal diameter, a fan arranged to deliver air to the lower end of said tube and a cap member telescopically arranged about the open upper end of said tube to separate the heat transfer material from its carrier air by reducing the lifting capacity of said air carrier medium.

4. In heat transfer apparatus, the combination comprising a gas pervious column of fluent solid heat transfer material enclosed by refractory walls defining a plurality of superposed chambers connected by elongated throat passageways of reduced cross-sectional area, means for separately contacting the heat transfer material within said superposed chambers by separate fluids for direct contact heat exchange therewith, a feeder arranged to withdraw hot heat transfer material from the bottom of said column at a selected rate for the gravitational flow of said heat transfer material through said chambers and connecting throat passageways, and means arranged to receive the heat transfer material from said feeder and to deliver said material to the upper end of said column including a vertically elongated tube having an upwardly increasing internal diameter, a fan arranged to deliver air to the lower end of said tube as a carrier medium for said heat transfer material, and an upwardly elongated cap member having a cross-sectional area in excess of said tube telescopically arranged to enclose the open upper end of said tube and to separate the heat transfer material from its carrier air by reduced the lifting velocity of said air carrier medium.

5. In heat transfer apparatus, the combination comprising a gas pervious column of fluent solid heat transfer material enclosed by refractory walls defining a plurality of superposed chambers connected by elongated throat passageways of reduced cross-sectional area, means for separately contacting the heat transfer material within said superposed chambers by separate fluids for direct contact heat exchange therewith, a feeder arranged to withdraw hot heat transfer material from the bottom of said column at a selected rate for the gravitational flow of said heat transfer material through said chambers and connecting throat passageways, and means arranged to receive the heat transfer material from said feeder and to deliver said material to the upper end of said column including a vertically elongated tube having an upwardly increasing internal diameter, a fan arranged to deliver gaseous carrier medium to the lower end of said tube, an upwardly elongated cap member having a cross-sectional area in excess of said tube telescopically arranged to enclose the open upper end of said tube and to separate the heat transfer material from its gaseous carrier medium by reducing the lifting velocity of said medium, and means for recycling said separated carrier medium to said fan for reuse.

6. In heat transfer apparatus, the combination comprising a gas pervious column of fluent solid heat transfer material, refractory walls confining said fluent column of heat transfer material and defining a plurality of superposed chambers connected by elongated throat passageways of reduced cross-sectional area, at least one of said throat passageways comprising an upper elongated tube of silicon carbide embraced by the refractory walls of an adjoining chamber bottom, a second silicon carbide tube of the same internal diameter having an outwardly flaring flanged end portion arranged for insertion in the upper end wall portion of the subjacent chamber, said second tube being held in abutting position adjoining the lower end of said upper tube by a rammed refractory material between the outer wall of said second tube and the inner surface of said refractory chamber wall, means for contacting the heat transfer material within said superposed chambers by separate fluids for direct contact heat exchange therewith, a feeder arranged to withdraw heat transfer material from the bottom of said column at a selected rate for the gravitational flow of said material through said chambers and connecting throat passageways, and elevator means arranged to receive the heat transfer material from said feeder and to deliver said material to the upper end of said column.

7. In heat transfer apparatus, the combination comprising a gas pervious column of fluent solid heat transfer material enclosed by refractory walls defining a plurality of superposed chambers connected by elongated toroat passageways of reduced cross-sectional area, at least one of said throat passageways comprising an upper elongated tube of silicon carbide embraced by the refractory walls of an adjoining chamber bottom, a second silicon carbide tube of the same internal diameter having an outwardly flaring flanged end portion arranged for insertion in the upper end wall portion of the subjacent chamber, said second tube being held in abutting position adjoining the lower end of said upper tube by a rammed refractory material between the outer wall of said second tube and the inner surface of said subjacent chamber wall, means for separately contacting the heat transfer material within said superposed chambers by separate fluids for simultaneous direct contact heat exchange therewith, a feeder arranged to withdraw heat transfer material from the bottom of said column at a selected rate for the gravitational flow of said material through said chambers and connecting throat passageways, and pneumatic elevator means arranged to receive the heat transfer material from said feeder and to deliver said material to the upper end of said column with a minimum amount of breakage.

8. In heat transfer apparatus, the combination comprising a gas pervious column of fluent solid heat transfer material enclosed by refractory walls defining a plurality of superposed chambers connected by elongated throat passageways of reduced cross-sectional area, means for separately contacting the heat transfer material within said superposed chambers by separate fluids for simultaneous direct contact heat exchange therewith, means for withdrawing heat transfer material from the bottom of the lowermost chamber of said column including a feeder and a spout, elevating means arranged to receive the heat transfer material from said feeder and to deliver said material to the upper end of said column, and seal means for avoiding fluid flow through said spout including a valved pipe connection in an intermediate portion of said spout for the introduction of an inert sealing fluid thereto at a pressure in excess of the fluid pressure in the lowermost chamber, and differential pressure responsive means arranged to regulate the valve in said pipe connection to control inert fluid flow to said spout to maintain substantially neutral fluid flow conditions between the bottom of said lowermost chamber and said inert fluid pipe connection.

9. In heat transfer apparatus, the combination comprising a gas pervious column of fluent solid heat transfer material enclosed by refractory walls defining a plurality of superposed chambers connected by elongated throat passageways of reduced cross-sectional area, means for contacting the heat transfer material within said superposed chambers by separate fluids for direct contact heat exchange therewith, a feeder arranged to withdraw heat transfer material from the bottom of said column through a connecting spout at a selected rate for the gravitational flow of said material through said chambers and connecting throat passageways, pneumatic elevating means arranged to receive the heat transfer material from said feeder and to deliver said material to the upper end of said column, and a seal means for avoiding fluid flow through said spout including a valved pipe connection to an intermediate portion of said spout for the introduction of an inert sealing fluid thereto at a pressure in excess of the pressure prevailing in the lower end of said pneumatic elevating means, and differential pressure responsive means arranged to regulate the valve in said pipe connection to control the inert fluid flow to said spout to maintain substantially neutral fluid flow conditions between the bottom of said column and said inert fluid pipe connection.

10. A pneumatic elevator for the transportation of pellets comprising an elongated hollow tube having an increasing internal area toward its pellet discharge end, a feeder arranged to deliver said pellets to the inlet end portion of said tube, a blower connected with and discharging carrier fluid to said tube, a damper positioned in the flow path of said carrier fluid, a control mechanism actuated by carrier fluid flow to position said damper and to maintain a substantially uniform flow of carrier fluid through said tube, and a cap member at the pellet discharge end of said tube arranged to separate said pellets from the carrier fluid by a reduction in the pellet lifting capacity of said carrier fluid for the separate discharge of pellets and carrier fluid therefrom.

11. A pneumatic elevator for the transportation of heat transfer pellets at a superatmospheric temperature comprising an upright elongated hollow tube having an increasing internal area toward its upper pellet discharge end, a substantially uniform flow of feeder arranged to continuously deliver said hot pellets into the lower end portion of said tube, means for delivering a fluid carrier medium into the lower end of said tube at a superatmospheric pressure and in sufficient volume to transport said pellets through said tube comprising a blower, a flow regulating damper associated with said blower and a control mechanism actuated by carrier fluid flow to position said damper, and a cap member telescopically enclosing the upper end portion of said tube, said cap member having an internal area greater than the internal area of said tube and having an outlet in a wall thereof beneath the open upper end of the tube for the discharge of pellets and an upwardly spaced outlet in a wall thereof for the separate discharge of said fluid carrier medium therefrom.

12. Apparatus according to claim 5, wherein said means for recycling separated carrier medium includes a duct connecting said elongated cap member and the inlet of said fan, and a cyclone arranged in said duct to separate entrained dust from said carrier medium.

13. In heat transfer apparatus, the combination comprising a gas pervious column of fluent solid heat transfer material enclosed by walls defining superposed chambers connected by an elongated throat passageway of reduced cross-sectional area, means for separately contacting the heat transfer material within said superposed chambers by separate fluids for direct contact heat exchange therewith, means for withdrawing heat transfer material from the bottom of the lowermost chamber of said column at a selected rate for the gravitational flow of said material through said chambers and connecting throat passageway, inert gaseous fluid-lift means arranged to receive the heat transfer material from the bottom of said lowermost chamber and to deliver said material to the uppermost chamber at the upper end of said column, gaseous fluid supply means arranged to deliver a gaseous fluid at a positive pressure to said fluid-lift means as a carrier medium for said heat transfer material, and means for regulating fluid flow to said fluid-lift means in response to a deviation of said flow from a predetermined value.

14. In heat transfer apparatus, the combination comprising a gas pervious column of fluent solid material enclosed by walls defining superposed chambers connected by an elongated throat passageway of reduced cross-sectional area, means for directly contacting the solid material while in one of said chambers with high temperature gaseous products of combustion, means for maintaining a fluid to be heat treated in intimate direct contact for a predetermined period with the heated solid material while in another of said chambers, means for withdrawing said solid material from the bottom of said column at a selected rate for the gravitational flow of said material through said chambers and connecting throat passageway, means arranged to receive the material from the bottom of said column and to deliver said material to a position above the upper end of said column including a vertically elongated tube having an upwardly increasing internal diameter, inert gaseous fluid supply means arranged to deliver a gaseous carrier medium under a positive pressure and at a controlled rate to the lower end of said tube, and separating means at the open upper end of said tube arranged to separate the solid material from said gaseous carrier medium for the separate discharge of each.

PAUL R. GROSSMAN.

REFERENCES CITED

The following references are of record in the file of this patent:

UNITED STATES PATENTS

| Number | Name | Date |
| --- | --- | --- |
| 1,512,561 | Oliphant | Oct. 21, 1924 |
| 1,825,707 | Wagner, Jr. | Oct. 6, 1931 |
| 1,890,562 | Clute | Dec. 13, 1932 |
| 1,957,224 | Neuman | May 1, 1934 |
| 2,399,450 | Ramseyer | Apr. 30, 1946 |
| 2,417,049 | Bailey et al. | Mar. 11, 1947 |
| 2,429,359 | Kassel | Oct. 27, 1947 |

FOREIGN PATENTS

| Number | Country | Date |
| --- | --- | --- |
| 180,397 | Great Britain | May 11, 1922 |